UNITED STATES PATENT OFFICE.

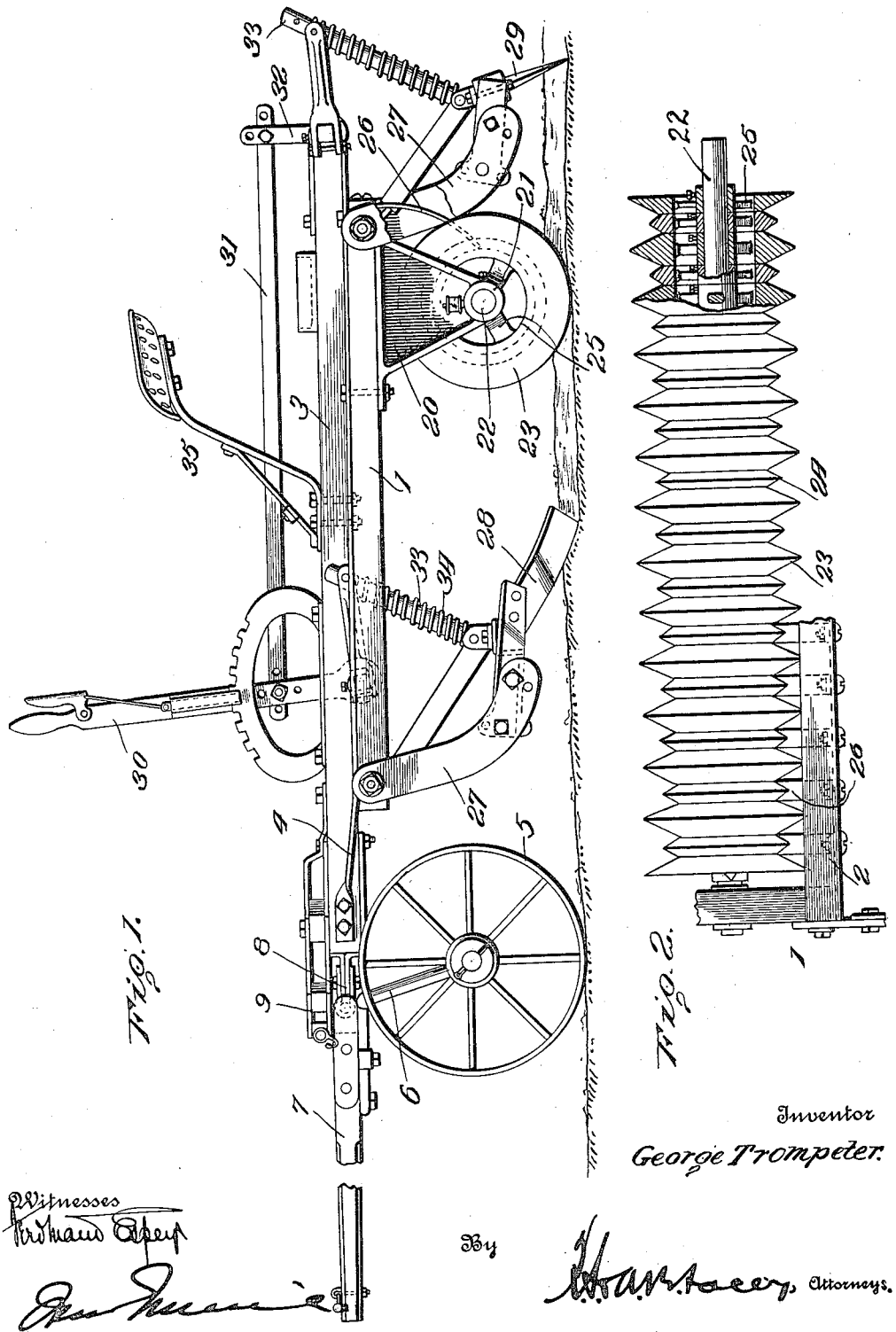

GEORGE TROMPETER, OF CLEARWATER, KANSAS.

LAND-ROLLER.

1,075,676.  Specification of Letters Patent.  Patented Oct. 14, 1913.

Original application filed March 1, 1912, Serial No. 680,952. Divided and this application filed September 3, 1912. Serial No. 718,357.

*To all whom it may concern:*

Be it known that I, GEORGE TROMPETER, a citizen of the United States, residing at Clearwater, in the county of Sedgwick and State of Kansas, have invented certain new and useful Improvements in Land-Rollers, of which the following is a specification.

This invention relates to improvements in rollers for treating the surface of the ground preparatory to planting therein and has for its object the provision of a roller by which the soil turned up by ground treating implement traveling in advance of the roller will be thoroughly packed so that seed planted therein will be held against loss under the influence of strong winds or other causes, this application being a division of an application filed by me March 1, 1912, Serial No. 680,952.

The present invention is illustrated in the accompanying drawings and will be hereinafter first fully described and then more particularly pointed out in the appended claims.

In the drawing, Figure 1 is a side elevation of an apparatus showing my improved roller in position thereon. Fig. 2 is a detailed plan view, partly broken away of the roller.

My improved roller is preferably employed upon an agricultural implement embodying a main frame composed of side bars and cross bars 2 connecting the same, a central longitudinal beam or perch 3 secured upon the cross bars and projecting slightly beyond same at its ends and braces 4 connecting the said perch with the side bars. The steering wheels 5 are carried by crank axle 6 which is secured to the under side of a tongue 7 at the rear end thereof, said tongue 7 being flexibly connected with the front end of the perch 3 by a universal coupling indicated at 8 and the draft applying device 9 being secured upon the perch at the front end thereof.

Depending from the side bars 1 of the main frame, at or near the rear ends thereof, are short standards 20 having journal boxes 21 at their lower ends to receive the ends of an axle 22 carrying a roller or packer consisting of a series of disks 23 and 24, the disks 24 being considerably less in diameter than the disks 23 and alternating therewith. The disks are all tapered or beveled toward their edges or peripheries so that they will readily take into the ground and aid in the cutting up of the same, while at the same time they are arranged closely together so that they present a continuous surface to the ground and consequently pack the same, as will be understood. The disks are all wheel-like and secured to the axle or shaft 22 by radial arms or spokes 25, as will be readily understood. Secured to and depending from the rear cross bar 2 of the main frame are a series of scrapers 26 which extend to the packer and into the spaces between the larger disks 23 so that any soil which may cling to the surface of the disks in the operation of the machine will be removed therefrom so that they will remain clean and therefore efficiently perform their functions, the inner ends or edges of the scrapers being notched to conform to and fit close against the peripheries of the disks.

Hangers 27 are pivotally secured to the main frame at the front and rear thereof and pulverizers 28 are supported from the front hangers while harrow teeth 29 are supported from the rear hangers, the roller being disposed between the two sets of hangers as clearly shown in Fig. 1. A controlling lever 30 rises from a rock shaft journaled in suitable bearings carried by the perch 3, said lever being connected by a link 31 with a crank arm 32 rising centrally from a rock shaft at the rear end of the perch. These rock shafts have lost-motion connections with rods 33 extending to and connected with the ground treating implements and springs 34 are coiled around the said rods to hold the said elements yieldably to their work.

By adjusting the lever, the depth to which the implements may take into the ground may be adjusted as will be readily understood and the implements will be permitted to yield to any unusual hard obstructions in their paths by the springs in the usual manner.

It will be readily noted that the larger disks will cut into the ground and will turn to one side the soil at the edges of the furrows which may be formed by the said disks and this soil will be crushed by the small disks and firmly placed or packed so that a fine, solid bed for sowing wheat or other seed will be provided. The soil will also be packed around the roots of young plants so that no injury may be suffered by them and up-rooting of the plants by strong winds cannot occur.

Having thus described my invention, what I claim is:—

1. The combination with a main frame, of a packing roller mounted thereon and consisting of a series of disks having beveled edges, the disks being in contact at their sides and the alternating disks being of different diameters.

2. The combination with a main frame, of a packing roller mounted thereon and consisting of a series of disks having beveled edges, the alternating disks being of different diameters, and a plurality of scrapers secured to and depending from the frame and extending between the larger disks and having notched edges to engage the peripheries of the smaller disks.

In testimony whereof I affix my signature in presence of two witnesses.

GEORGE TROMPETER. [L. S.]

Witnesses:
D. E. LOGER,
AARON U. WHITE.

Copies of this patent may be obtained for five cents each, by addressing the "Commissioner of Patents, Washington, D. C."